Aug. 18, 1936.                K. R. SHAW                2,051,316
                CORDAGE AND METHOD OF MAKING SAME
                         Filed Nov. 4, 1933
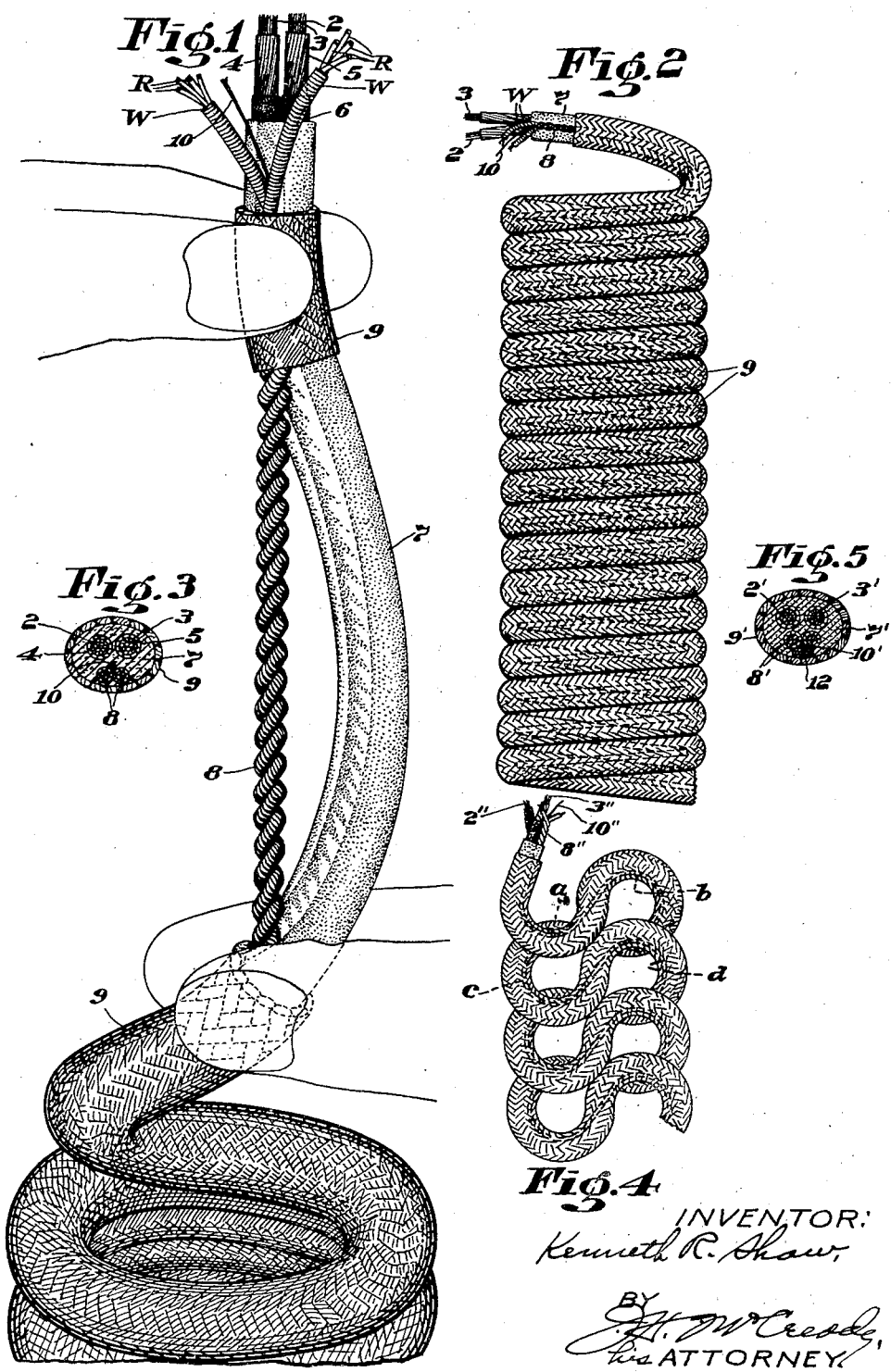

Patented Aug. 18, 1936

2,051,316

UNITED STATES PATENT OFFICE

2,051,316

CORDAGE AND METHOD OF MAKING SAME

Kenneth R. Shaw, Easthampton, Mass., assignor to United Elastic Corporation, Easthampton, Mass., a corporation of Massachusetts Application November 4, 1933, Serial No. 696,652

11 Claims. (Cl. 173—367)

In my co-pending application Serial No. 672,859 (now issued as Patent No. 1,989,066) I have described and claimed an elastic cord which normally, or when in its free condition, assumes a looped form that greatly reduces its over-all length. In one commercial form of the invention the cord normally takes a helically coiled condition, this effect being produced by an elastic member included in the structure of the cord and which serves, because of its longitudinal elasticity, to coil the cord into this form when allowed to do so. When such a cord is pulled out into its extended or straightened condition a certain amount of twist is always introduced into it by this change in form, one turn of twist being put into the cord by each turn of the helix. The twisting action so produced tends to make the cord take on a permanent twist which prevents the coils from closing, and in order to avoid this effect it has been necessary to make the cord in sections with adjacent sections wound in opposite directions. In pulling such a cord into an extended form the junction point between adjacent sections rotates around the axis of the helix and thus prevents the twisting of the cord. As the force tending to stretch the cord is released and the cord returns to its normal or contracted condition again, the junction point or points rotate in the opposite direction.

Such cord is highly useful, but it is desirable for some purposes to avoid the necessity for making the cord in oppositely wound sections and while still preventing the undesirable permanent twisting of the cord. To devise a thoroughly practical solution for this problem forms the chief object of the present invention.

Referring now to the drawing,

Figure 1 is a perspective view illustrating a cord structure embodying this invention;

Fig. 2 is a side view of a coil of cord like that illustrated in Fig. 1;

Fig. 3 is a transverse, sectional view of the cord illustrated in Figs. 1 and 2;

Fig. 4 is a plan view of another embodiment of the invention; and

Fig. 5 is a view similar to Fig. 3 illustrating a slightly different construction.

The most important commercial application of the invention at the present time is in the manufacture of electrical conducting cords of the general character used, for example, with electric flat irons, electric toasters, vacuum cleaners, telephones, and the like. Accordingly, the drawing shows the invention applied to a conducting cord of this general type. As illustrated in Figs. 1, 2 and 3, the cord comprises two flexible conductors indicated at 2 and 3, respectively, each preferably consisting of a multiplicity of metal wires with cotton coverings 4 and 5 wound around them and additionally insulated, if desired. As shown, the cotton coverings are enclosed in rubber insulating sleeves, one of which is shown at 6 in Fig. 1, and asbestos rovings are wound around these sleeves or jackets. When two conductors so insulated are bound together the rovings unite to form a fibrous mass 7.

Extending along the wires closely beside and parallel to them is a tensioned elastic cord 8 which is bound to the conductors by a jacket 9 braided around the wires and the cords and serving to hold these parts in a substantially constant positional relationship to each other throughout the length of the entire cord structure. Since the elastic element 8 is displaced from the neutral axis of bending of said structure and always lies at the same side of the wires 2 and 3 and is under tension, this member will operate, when the cord is released and left in a free condition, to coil the cord into substantially a helical form, this action being produced by the inherent tendency of the elastic member to contract and the fact that this member is located throughout the length of the cord at one side of the neutral axis of bending of the cord.

A cord made in the manner above described is disclosed in my earlier application above designated and reference may be made to that case for a more complete disclosure of details of construction and methods of manufacture of such a cord. As stated in said application, the elastic member may consist of any suitable material having the necessary longitudinal elasticity and the requisite flexibility, such for example, as a helically coiled spring. The best material, however, which I have been able to find for this purpose is rubber. This material preferably is used in the form of guimp or covered rubber consisting of several strands of rubber R, Fig. 1, with thread or yarn wound around them to form a cover W for them. This winding operation preferably is performed while the rubber is stretched and elongated very substantially, say for example, 500% to 700%, and often the guimp includes two covers, one wound reversely on the other. When the tension is released the coils or turns of these yarn or thread covers abut against each other and thus limit the degree to which the rubber can contract, therefore holding the rubber normally in a state of tension. A product of this kind is particularly useful in an elastic cord of the character provided by this invention. The term "guimp" will be used hereinafter to designate a covered rubber thread of the character above described.

According to the present invention the elastic element or cord, in addition to having longitudinal elasticity, is so biased or tensioned that it not only serves to hold the cord normally in a shortened or contracted form, but also exerts a twisting action on the cord. As above stated, the act of stretching a helically wound cord into a straight condition introduces twist in the cord. I have found that it is entirely practical to yieldingly resist this twist by the twist of the elastic element 8 so that the latter will counteract the former when the cord is released and allowed to assume its normal shape. The resistance to twist so introduced can readily be made such that any kinking or permanent twisting of the cord that otherwise would be caused is effectually prevented.

In addition, this twisting action of the elastic element serves, when the cord is released, to force adjacent turns of the helix into contact with each other, or, in other words, to make a more tightly coiled helix, such as that shown in Fig. 2. For this reason the elastic cord structure illustrated in the drawings is shown as composed of two strands of guimp twisted together in such a direction as to impart the desired torsional twist to the entire cord necessary to hold adjacent turns of the helix closely in contact with each other. I have found it entirely feasible by this means to so resist the deformation of a torsional nature which is introduced into the cord by the act of pulling it into a straightened condition, that kinking of the cord is effectually prevented, and the necessity for reverse winding is avoided.

While the specifications for such a cord structure necessarily will vary with the uses to be made of the cord and the preferences of different manufacturers, a typical product suitable for use with electric flat irons, electric toasters, and the like, may be made by using for the conductors 2 and 3 a wire consisting of forty strands of No. 34 B & S gage copper wire insulated, as above described, and in accordance with the standard specifications of the Underwriter's Laboratories. The guimp may be made in the usual manner to afford the requisite strength. Preferably the two strands of guimp are made at the same time and wound on a single beam. Later this beam is transferred to a spinner head and the two ends of guimp are drawn off slowly while the beam is spun around, thus twisting the two strands together into the form illustrated in Fig. 1. While this twisting operation is being performed, a strong cotton or linen thread 10 is run in with the guimp to furnish a limit of stretch. Subsequently the two conductors 2 and 3 are laid parallel to each other and the twisted guimp 8 is run with them, under the proper tension, into a braider which fabricates the jacket 9 around all of these stranded members and binds them securely together. The thread 10 is of advantage in this operation since it is merely necessary to put enough tension on the twisted cord 8 to pull it out to its limit, as determined by the cotton or linen thread, to ensure the proper amount of stretch being applied to the cord while it is assembled with the conductors and the outer jacket is braided around this assembly.

If desired, independent elastic cords may be used to perform the respective functions of contracting the cord and producing the desired degree of twist in it, although the element depended upon for the latter function necessarily will have longitudinal elasticity and therefore will tend to contract the cord when it is pulled into its extended condition. Such a construction is illustrated in Fig. 5 in which the parts corresponding to those shown in Figs. 1, 2 and 3 are designated by the same but primed numerals. Here the cord 8' performs primarily the function of producing the desired torsional effect or twist while the rubber cord 12 is depended upon chiefly to produce the folding or coiling action. This construction is regarded as the equivalent of that previously described.

It will be observed that the conductors 2 and 3 with their insulated coverings form the core structure of the cord, and it will be evident that this invention is equally applicable to cordage of the type in which the core structure consists of fibrous non-conducting material, such as hemp, cotton, or other fiber commonly used in cordage.

In my earlier application above designated I have illustrated a self-folding cord of the form shown in Fig. 4 in which the elastic cord is shifted at regular intervals from one side of the neutral axis of bending to the other so that its contractile force results in folding the cord into figure eight loops. It will be observed in Fig. 4 that the cord 8'' lies at the inside of the upper curve a, then shifts to the other side of the cord but to the inside of the curve b, and similarly changes its position where the cord is curved to make the loops c and d, and so on throughout the length of the cord structure. The twisted guimp is of advantage in this type of cord in making the overlapping portions of the loops lie more closely together and thus causing the cord to fold itself into a more compact form when in its free or released condition. A single covered guimp is preferable both in this cord and also in that shown in Fig. 1.

While I have herein shown and described a preferred embodiment of my invention, it will be evident that the invention may be embodied in other forms without departing from the spirit or scope thereof.

Having thus described my invention, what I desire to claim as new is:

1. An elastic cord structure of the type which automatically contracts into a shortened and looped form when released but which can be pulled out into an extended condition, having within the structure thereof a longitudinally expansible and contractible member so biased as to tend constantly to twist said cord around the longitudinal axis of the cord.

2. An elastic cord structure having the characteristic of automatically contracting into a helically coiled form when released, having within the structure thereof a longitudinally elastic member so biased as to tend constantly to twist said cord around its longitudinal axis in a direction serving to hold adjacent loops of said helix close to each other when the cord is released and free to contract.

3. An elastic cord structure of the type which when released and in its normal condition assumes the form of closely adjacent loops, having within the structure thereof a twisted rubber cord extending longitudinally of said structure and exerting a twisting action on said structure serving to hold said loops in lateral contact with each other when said cord is in said released and normal condition.

4. An elastic cord structure comprising a flexible core, an elastic cord extending longitudinally of said structure and displaced throughout the greater part of its length from the neutral axis of bending of said structure, said elastic cord being shifted at intervals from one side to the other of said axis and being so tensioned that its tendency to contract longitudinally tends to hold said structure normally in a contracted and folded condition, and being so biased that it constantly exerts a twisting action on said structure in a direction transverse to said axis and serving to urge adjacent loops of said structure into lateral contact with each other when the cord is in its contracted condition.

5. A self-contracting elastic cord structure comprising a flexible core, a tensioned elastic cord lying beside and closely adjacent to said core but displaced from the neutral axis of bending of said structure, said elastic cord being twisted, whereby it exerts a substantial torsional effort on said structure, and a flexible jacket closely enclosing said core and said elastic cord substantially throughout the length of said structure.

6. An article of the character described comprising a flexible conductor, a tensioned elastic cord extending along and closely beside said conductor in a generally parallel relationship thereto but displaced from the neutral axis of bending of said conductor and serving, due to its longitudinal elasticity, to hold said conductor normally in a looped condition, means for fastening said cord and said conductor together to hold them constantly in said generally parallel relationship to each other, said cord being twisted and thereby serving to impart a sufficient twisting effort to said conductor to hold the loops in said article substantially in lateral contact with each other when in its normal and contracted condition.

7. That improvement in methods of making cordage which consists in associating a tensioned and elongated elastic cord in a twisted condition with suitable core material to form a cord structure, and so controlling the position of said elastic cord in the structure so produced as to maintain said elastic cord in a spaced relationship to the neutral axis of bending of said structure throughout a large part of the length thereof, whereby said tensioned elastic cord serves, when allowed to contract, to bend the entire cord structure into a looped condition and to twist said structure about its longitudinal axis sufficiently to hold the loops of said cord in lateral contact with each other when the cord is allowed to contract fully.

8. An elastic cord structure having the characteristic of automatically contracting into a helically coiled form when released, having within the structure thereof a longitudinally elastic element which is so biased as to substantially counteract the twist introduced into the cord by the act of pulling the cord into its extended condition.

9. An elastic cord structure comprising a core, a longitudinally expansible and contractible elastic cord extending along and closely beside said core and tending, when the cord structure is extended, to return it to its contracted condition, said elastic cord being so biased as to exert constantly a twisting action on said structure in a direction opposite to that produced by the extension of said structure, whereby such twisting action cooperates with the contractive effort of the elastic cord to hold the entire cord structure normally in a closely looped condition.

10. A self-contracting cord structure comprising flexible core members, and having in the structure thereof elastic means capable of longitudinal expansion and contraction and serving by such longitudinal elasticity to hold the entire cord structure normally in a contracted and looped condition, and elastic means in said cord for exerting a twisting action on the cord structure in such a direction as to oppose the twist produced by the extension of said structure and to force adjacent loops of said structure substantially into lateral contact with each other when the cord is allowed to assume its contracted and looped condition.

11. A self-contracting cord structure comprising flexible core members, and having in the structure thereof rubber strands so tensioned as to cause their longitudinal elasticity to hold the cord normally in a contracted and looped condition, but so biased as to exert normally a torsional effort on the cord, additional to said contracting action, tending to hold adjacent loops in lateral contact with each other when the cord is in a free and contracted condition.

KENNETH R. SHAW.